TELEPHONE-TELEVISION SUBSTATION APPARATUS

Filed July 25, 1967 2 Sheets-Sheet 1

INVENTORS
D. R. HERRIOTT
K. M. POOLE
BY Arthur J. Torsiglieri
ATTORNEY

United States Patent Office 3,525,807

Patented Aug. 25, 1970

3,525,807
TELEPHONE-TELEVISION SUBSTATION APPARATUS

Donald R. Herriott, Morris Township, Morris County, and Kenneth M. Poole, Bernardsville, N.J., assignors to Bell Telephone Laboratories, Incorporated, Murray Hill and Berkeley Heights, N.J., a corporation of New York Filed July 25, 1967, Ser. No. 655,925
Int. Cl. H04n 5/26
U.S. Cl. 178—7.85 8 Claims

ABSTRACT OF THE DISCLOSURE

In a telephone-television substation, light from the kinescope tube is projected through a Fresnel lens which images it at a location appropriate for observation by a viewer. A diffusing screen is used to control the illuminance at the viewing plane. The field of view of the camera tube is centered on the viewing plane so that in order to see the displayed image the viewer must orient himself with respect to the camera tube for proper transmission of his image. Stereoscopic images may also be projected by the optical systems described.

BACKGROUND OF THE INVENTION

In telephone-television systems it is important that the substation subscriber orient himself within the field of view of the television camera when he is operating the substation so that he can be observed by the party with whom he is communicating. The patent of W. E. Kock et al., 2,895,005, the patent of R. E. Prescott, 3,116,365, and the copending patent application of W. T. Rea, Ser. No. 605,931, filed Dec. 29, 1966 and assigned to Bell Telephone Laboratories, Incorporated, describe various signaling devices by which the viewer can determine that he is within the field of view of the television camera. It has been observed, however, that because telephone-television communication has the attributes of face-to-face conversation, the viewer is usually not consciously aware of his appearance to the other party. When his attention is directed to the image of the other party, he may not notice visual warnings intended to keep him within the field of view of the camera.

Because of the illusion of face-to-face conversation, it is desirable to locate the camera tube as close as possible to the display screen. If this can be done, the eyes of a viewer will be directed nearly at the camera tube and upon reproduction, the viewer's eyes will be directed at the other party to give the impression of eye contact during conversation. If the camera is very far removed from the display beam, the reproduced image of the viewer will create the impression that the viewer's attention is directed elsewhere.

The copending application of M. H. Crowell et al. Ser. No. 667,167, filed Sept. 12, 1967 and assigned to Bell Telephone Laboratories, Incorporated describes how requirements for transmitting and reproducing written characters differ from the requirements for face-to-face transmission and reproduction and how a telephone-television substation can be modified to transmit information in the "document mode." For transmitting the information contained on documents, the resolution of the camera and display tubes should be increased by increasing the number of lines per frame. Preferably, a separate camera tube is used for transmitting document information, but the same kinescope tube can be used for reproduction by appropriately switching control elements of the tube to give the higher line rate for each raster. It has been observed, however, that the area of the display screen should be larger in the "document mode," than for face-to-face transmission to make the reproduced document easily readable.

The illusion of face-to-face conversation can be further enhanced by using stereoscopic principles of television reproduction. In the least expensive of these proposed systems, a pair of images are reproduced by the cathode ray tube which are observed by the viewer through a pair of special lenses in the same manner as in the operation of the conventional stereoscope. The lenses, however, tend to obscure the viewer which is, of course, undesirable for transmission of the viewer's image.

SUMMARY OF THE INVENTION

It is an object of this invention to provide improved telephone-television substation apparatus.

This and other objects of the invention are attained in an illustrative embodiment thereof comprising a kinescope display tube and a television camera tube. The light of the display tube is imaged by a projection lens onto a Fresnel lens. The Fresnel lens concentrates or partially focuses the light so that the projected image is observable only within a limited area of a viewing plane. A diffusing screen is located in close proximity to the Fresnel lens for distributing the light over the desired area of the viewing plane.

The camera tube is directed at the viewing plane such that the optic axis of the camera tube lens approximately intersects the axis of the projected display at the viewing plane. To see the projected image, the viewer must orient his head so that it lies approximately on the axis of the Fresnel lens, and to see the entire image his eyes should be located approximately at the viewing plane. When the viewer so positions his head to observe the image, he also centers it in the field of view of the television camera tube. As a result, signal and warning devices can be eliminated and a viewer may direct his undivided attention to the projected image without making any conscious effort to maintain himself within the field of view of the camera tube.

In a preferred embodiment, light is reflected by a first mirror from the cathode ray tube through the projection lens to a second mirror, toward a third mirror, and hence through the Fresnel lens. Part of the camera tube may be located behind the third mirror with the viewing lens of the camera tube being in close proximity to one edge of the third mirror. In this manner, the camera tube can be maintained in much closer proximity to the viewing screen than in prior substations, thereby enhancing the effect of eye contact during face-to-face transmission.

A subsidiary advantage of the projection system described is that projection lenses giving different magnification can be easily interchanged. Thus, for face-to-face transmission the magnification provided by the lens may be relatively small, but for "document mode" transmission, a lens of larger magnification may be used for giving a larger area of display and thereby increasing the legibility of the characters on the reproduced document.

Another advantage of our projection system is that it can easily be modified for stereoscopic reproduction in a manner compatible with the requirement of telephone-television transmission. Two stereoscopic images are formed by the display tube which are projected through a Fresnel lens as described before. The Fresnel lens in conjunction with an appropriate diffusing screen distributes the light of the two images properly so that they can be seen by the two eyes of the viewer without the necessity for any special stereoscopic lenses for combining the images; thus, the viewers face is unobscured.

DESCRIPTION OF DRAWING

These and other objects, features, and advantages of the invention will be better understood from a consideration of the following detailed description, taken in conjunction with the accompanying drawing in which.

DETAILED DESCRIPTION

Figure 1:
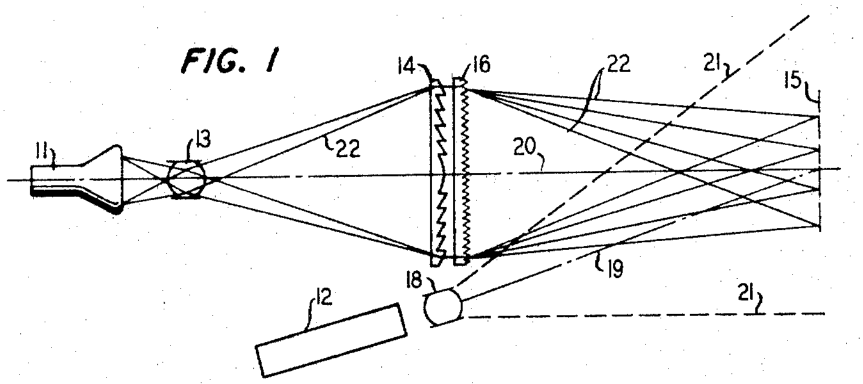
FIG. 1 is a schematic illustration of a telephone-television substation which illustrates certain principles of the invention.

Referring now to FIG. 1 there is shown a schematic illustration of a telephone-television substation comprising a kinescope tube 11 and a television camera tube 12. A projection lens 13 images the display of the kinescope tube onto a Fresnel lens 14 which in turn images the display along a viewing plane 15. In other words, the object plane of projection lens 13 is at the face plate of kinescope tube 11, the image plane of projection lens 13 is at the Fresnel lens 14, the object plane of Fresnel lens 14 is the plane of projection lens 13 and the image plane of the Fresnel lens is the viewing plane 15. A diffusing screen 16 is located in close proximity to the Fresnel lens 14. Associated with the camera tube 12 is a viewing lens 18 having an optic axis 19.

The Fresnel lens 14 projects light along an axis 20 which approximately intersects the optic axis 19 of the viewing lens 18 at the viewing plane 15. The camera tube has a field of view indicated approximately by dotted lines 21. The light of the kinescope display is concentrated or partially focused by the Fresnel lens 14 as shown by lines 22 which indicate light ray paths. In order for a viewer to observe the projected display, it is necessary for him to locate his eyes within the limited light path projected by the Fresnel lens as indicated by light rays 22, and to see the entire image, he must locate his eyes at or near viewing plane 15. When he places himself at a position to see the kinescope display, he also centers his head within the field of view of the camera tube 12. Hence, it is unnecessary for him to observe any signals or visual indications; the viewer centers himself for proper transmission of his own image merely by observing the kinescope display.

Figure 2:
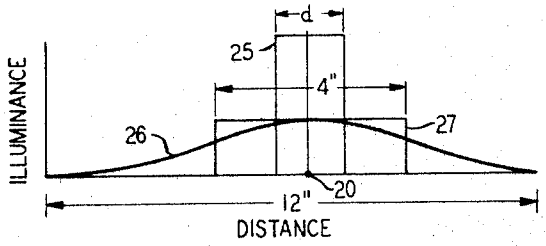
FIG. 2 is a graph of illuminance versus distance in the viewing plane of the apparatus of FIG. 1.

Referring now to FIG. 2, there is shown a graph of illuminance at the viewing plane 15 with respect to distance about the axis 20 of the projected light. In the absence of the diffusing screen 16, the display imaged on the viewing plane would cover an area having a diameter *d* that would be approximately equal to the diameter of the image of the projection lens 13. In most practical projection systems this area would be so small that the viewer would be able to observe it with only one eye and it would be difficult for the viewer to find the displayed image.

The purpose of the diffusing screen 16 of FIG. 1 is to distribute the illuminance over an area preferably 12 inches in diameter as shown by the curve 26. A suitable diffusion exists when the integrated illuminance of curve 26 is the same as a 4 inch diameter uniform distribution having the same illuminance as the maximum illuminance of curve 26 on the optic axis 20. A hypothetical 4 inch diameter uniform distribution is shown by curve 27. The construction and location of diffusion screen 16 such that the area under curve 20 is approximately equal to the area under curve 27 is a matter within the ordinary skill of a worker in the art.

It can be shown that without the diffusing screen 16, the illuminance indicated by curve 25 is the same as that observed when looking at the kinescope directly. With the diffusing screen, the illuminance on axis is reduced by the ratio of the area of a 4 inch diameter circle to the area of the image of the projection lens aperture. Additional energy is lost in reflection, scattering, and absorption by the optical components. However, the intensity of the image on a kinescope tube will increase considerably if the scanned area is reduced at constant beam power.

Figure 3:
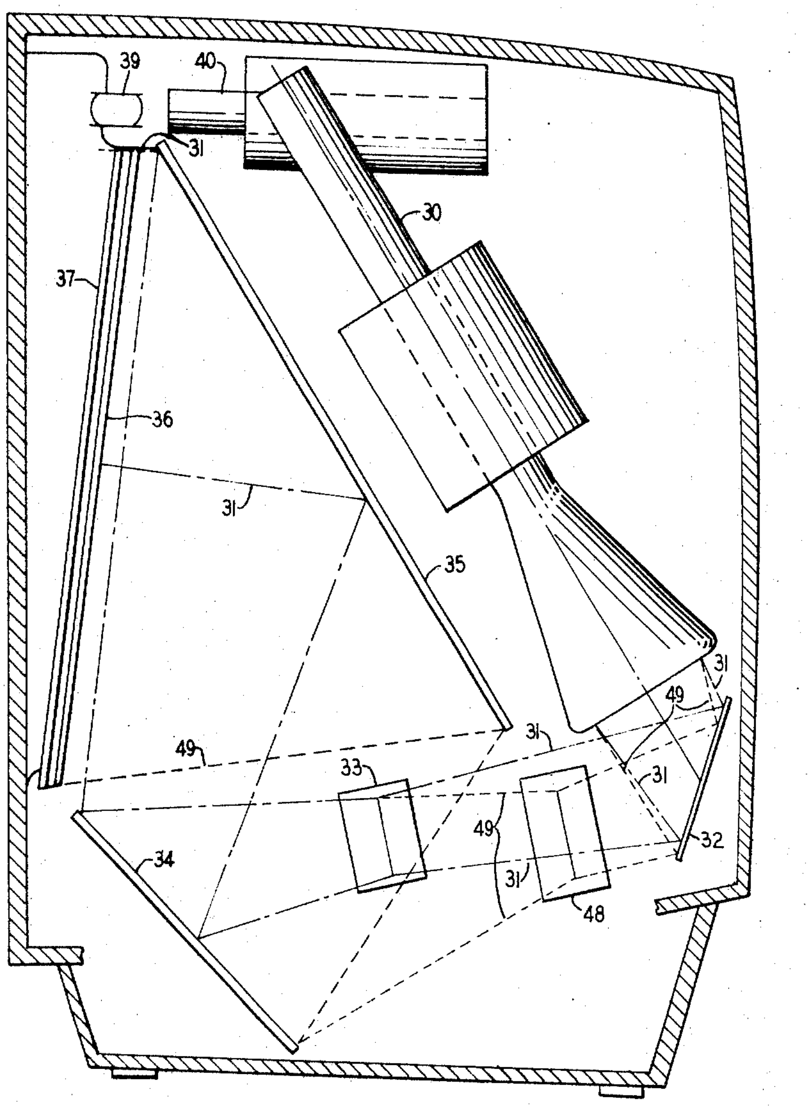
FIG. 3 is a schematic illustration of another embodiment of the invention.

FIG. 3 shows a substation unit employing the principles described above. A kinescope tube 30 generates light defined by boundaries 31 which is reflected from a first mirror 32 through a projection lens 33, to a second mirror 34, to a third mirror 35, and hence through a Fresnel lens 36 and a diffusing screen 37. As in the embodiment of FIG. 1, the conjugate planes of projection lens 33 lie at the face plate of the kinescope tube and at the Fresnel lens, while the conjugate planes of the Fresnel lens lie at the projection lens 33 and at a viewing plane which is not shown. Closely adjacent to one edge of the diffusing screen 37 is a viewing lens 39 for imaging light onto a television camera tube 40.

FIG. 3 demonstrates how a projection system of the type shown in FIG. 1 can be enclosed within a compact container through the use of mirrors for projecting the displayed light along the irregular path. FIG. 3 also shows that our projection system gives the added advantage of enhanced eye contact because the viewing lens 39 can be placed in extremely close proximity to the Fresnel lens 36 and that as a result, a viewer looking at the displayed picture will appear to be looking at the viewing lens 39 of the camera tube 40. On the other hand, in conventional substations, the camera tube cannot be placed very closely to the face plate of kinescope tube because of the bulk of both the camera tube and the kinescope tube. Notice that in the FIG. 3 embodiment part of the camera tube is actually located behind the mirror 35.

Figure 4:
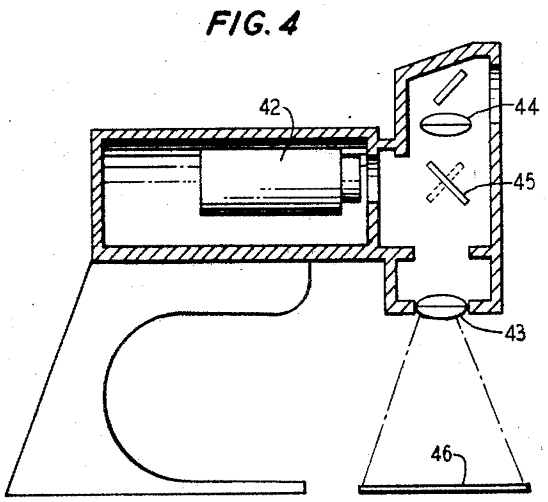
FIG. 4 is a schematic illustration of document mode camera apparatus in accordance with an embodiment of the invention.

Another subsidiary advantage of our projection system is that interchangeable projection lenses can be used for altering the magnification of the picture displayed by the kinescope. The substation shown in FIG. 3 is adapted to receive and transmit pictures of documents as well as images of people. A camera tube attachment that may be used for transmitting information in the "document mode" is shown in FIG. 4; it comprises a camera tube 42, viewing lenses 43 and 44, and an adjustable mirror 45. For transmitting characters on a document 46, the adjustable mirror is positioned as shown so that viewing lens 43 images light from the document onto the camera tube 42. Appropriate switching devices in the substation connect camera tube 42 to an output line and disconnect the camera 40 of FIG. 3 which is used only for transmission in the "face-to-face mode." The line rate of camera tube 42 is preferably higher than that of camera tube 40 to give the higher resolution required for clear legibility of documents. For example, camera tube 42 may scan at 1080 lines per frame, while camera tube 40 of FIG. 3 may scan at only 540 lines per frame. With the adjustable mirror rotated at 90 degrees as shown by the dotted lines, light from a chalkboard or other vertically extending object may be imaged on the camera tube.

Document mode information is received in the substation of FIG. 3 by switching circuits connected to kinescope tube 30 to give the tube the high line rate required for document reproduction. The same control that switches the kinescope circuits likewise removes lens 33 from the path of projected light and inserts a second projection lens 48. Consider the document mode light to have boundaries 49; due to the larger magnification of lens 48, the projected light having boundaries 49 is projected over the entire area of the Fresnel lens 36. This, of course, enhances the legibility of relatively small characters on reproduced documents. As shown in FIG. 3, the height of the document mode display is approximately twice that of the face-to-face display and the area is approximately 4 times as great. The control element for interchanging the projection lenses 33 and 48 and for switching the line rate of the kinescope tube 30 may take any of a number of known forms which would be apparent to those skilled in the art.

Figure 5:
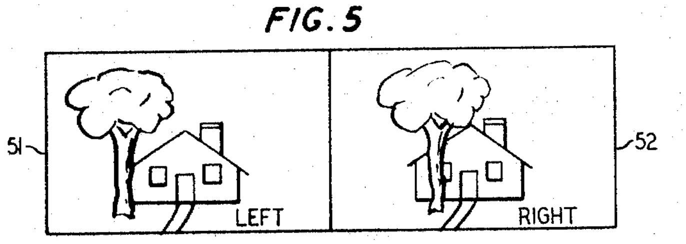
FIG. 5 is an illustration of a stereoscopic display.

Another advantage of our projection system is that it can be readily adapted for stereoscopic displays. FIG. 5 shows a typical stereoscopic display in which picture 51 portrays a typical scene as seen by the left eye and picture 52 portrays the same scene as seen by the right eye. As is well known in the art, stereoscopic scenes such as this can be transmitted by using a television camera tube having separate viewing lenses corresponding to the scenes seen by the two eyes. These two scenes are then displayed on the face plate of the kinescope substantially as shown in FIG. 5.

Figure 6:
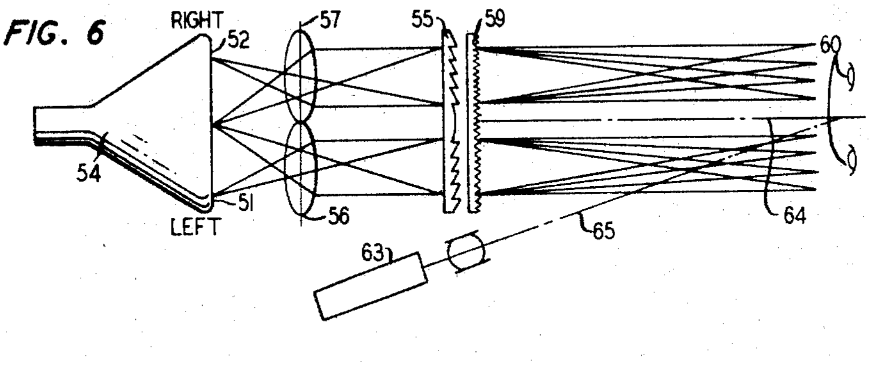
FIG. 6 is a schematic illustration of a stereoscopic substation in accordance with another embodiment of the invention.

FIG. 6 shows a schematic view of a kinescope tube 54 for reproducing pictures 51 and 52 of the type shown in FIG. 5. These two pictures are respectively imaged onto a Fresnel lens 55 by identical projecting lens 56 and 57. As before, the Fresnel lens concentrates the light along the viewing plane at which the viewer may observe the pictures. In this instance, the viewer's eyes are shown schematically at 60. A diffusing screen 59 diffuses the light to control the location at which the image can be seen.

Figure 7:
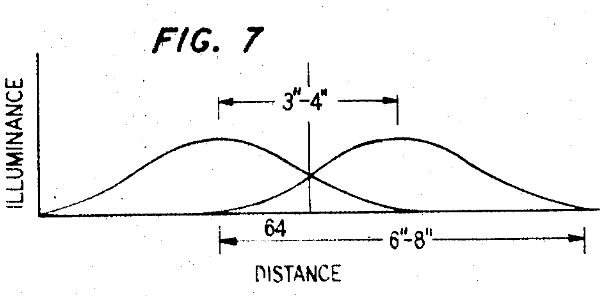
FIG. 7 is an illustration of illuminance versus distance along the viewing plane of the apparatus of FIG. 6.

Referring to FIG. 7, curve 61 shows the average distribution of illuminance resulting from the projection of picture 51, while curve 62 shows the distribution of illuminance of picture 52. The characteristics of lenses 56 and 57 and Fresnel lens 55 are determined in a known manner such that the center-to-center spacing of the central axes of curves 61 and 62 are approximately 3 to 4 inches as shown in FIG. 7. This corresponds approximately to the spacing between the eyes so that the picture 52 is seen predominantly with the right eye and the picture 51 is seen predominantly with the left eye. The diffusing screen 59 distributes the light over an area having a diameter of 6 to 8 inches as shown to avoid abrupt cutoffs of the displayed pictures.

The optic axis 64 of the Fresnel lens intersects the optic axis 65 of the viewing lens of the camera tube 63. As before, the viewer must orient himself within the field of view of camera tube 63 of FIG. 6 in order to see the displayed stereoscopic pictures. An additional advantage of this projection system is that the viewer can see the displayed image without looking through special lenses which would obscure his face and hence the transmission of his own image by the camera 63.

It is to be understood that the various embodiments shown are intended only to be illustrative of the inventive principles involved. Various embodiments and modifications other than those shown may be made by those skilled in the art without departing from the spirit and scope of the invention.

What is claimed is:

1. In combination:

a kinescope tube for forming a display of a subject;

means for projecting light constituting said display along a predetermined path;

a television camera tube having a field of view substantially coextensive with part of said light path; and means comprising a Fresnel lens located in said light path for partially focusing said light, thereby constraining a viewer of the kinescope display to orient himself within the field of view of the camera tube.

2. The combination of claim 1 wherein:

the projecting means comprises a projection lens;

the Fresnel lens has an object plane at the location of the projection lens, and an image plane at a location at which the viewer may observe the projected display;

the path of the light projected from the Fresnel lens has a central axis; and the axis of the field of view of the camera tube approximately intersects the central axis of the projected light at said image plane.

3. The combination of claim 2 further comprising:

means comprising a diffusing screen in close proximity to the Fresnel lens for distributing projected light over an area on said image plane having a diameter of approximately 12 inches, the average illuminance at the image plane being greatest at the location of the optic axis and the average illuminance distribution along any line in the image plane that intersects the optic axis being approximately a symmetrical distribution.

4. The combination of claim 3 wherein:

the total integrated luminous flux over said image plane area is substantially equal to the integrated luminous flux over an area 4 inches in diameter of light having a constant illuminance equal to said illuminance at the location of the optic axis on the image plane.

5. The combination of claim 2 wherein:

the projection means comprises two interchangeable projection lenses, one having a higher magnification than the other.

6. The combination of claim 1 wherein:

the display formed by the kinescope tube comprises two side-by-side stereoscopic displays; and the projection means comprises a pair of projection lenses each for imaging one of the stereoscopic displays on the Fresnel lens.

7. The combination of claim 5 wherein:

the Fresnel lens has an optic axis, an object plane at the location of the projection lenses, and an image plane at a location at which a viewer may observe the stereoscopic images; and means comprising a diffusion screen in close proximity to the Fresnel lens for distributing light from each of said projection lenses over an area on said image plane having a diameter of approximately 3 to 5 inches;

the center-to-center spacing of said projection lenses being approximately 3 to 4 inches.

8. The combination of claim 6 wherein:

the axis of the field of view of the camera tube approximately intersects the optic axis of the Fresnel lens at the image plane.

References Cited

UNITED STATES PATENTS

| | | | |
|---|---|---|---|
| 2,260,228 | 10/1941 | Moller et al. | 250—211 |
| 2,878,310 | 3/1959 | Becker | 178—6 |

ROBERT L. GRIFFIN, Primary Examiner

B. L. LEIBOWITZ, Assistant Examiner

U.S. Cl. X.R.

178—6